May 26, 1942.  K. W. DILLMAN ET AL  2,284,563
APPARATUS FOR MAKING REINFORCED SHEETS
Filed Dec. 16, 1938  6 Sheets-Sheet 3
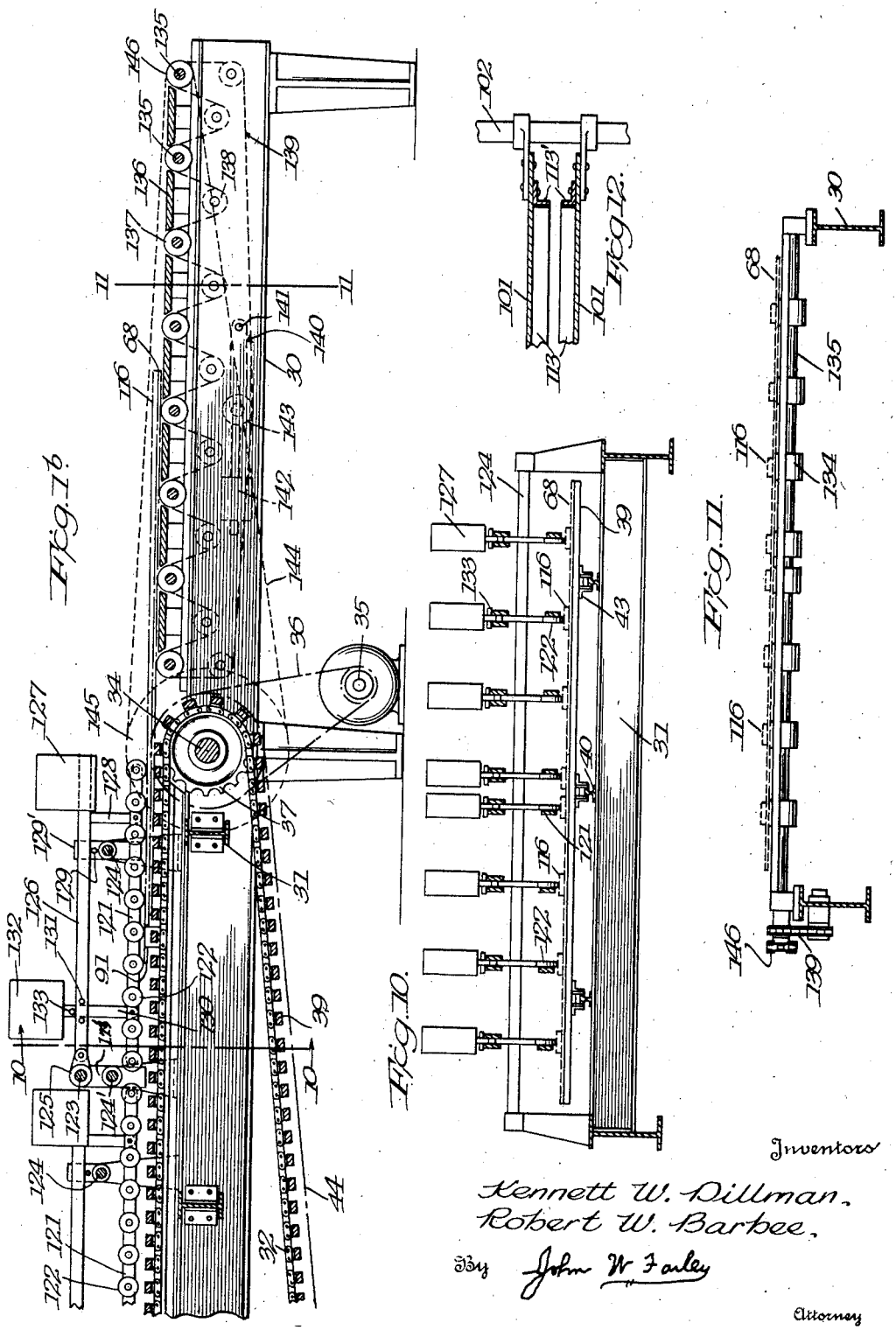
Inventors
Kennett W. Dillman,
Robert W. Barbee,
By John W. Farley
Attorney

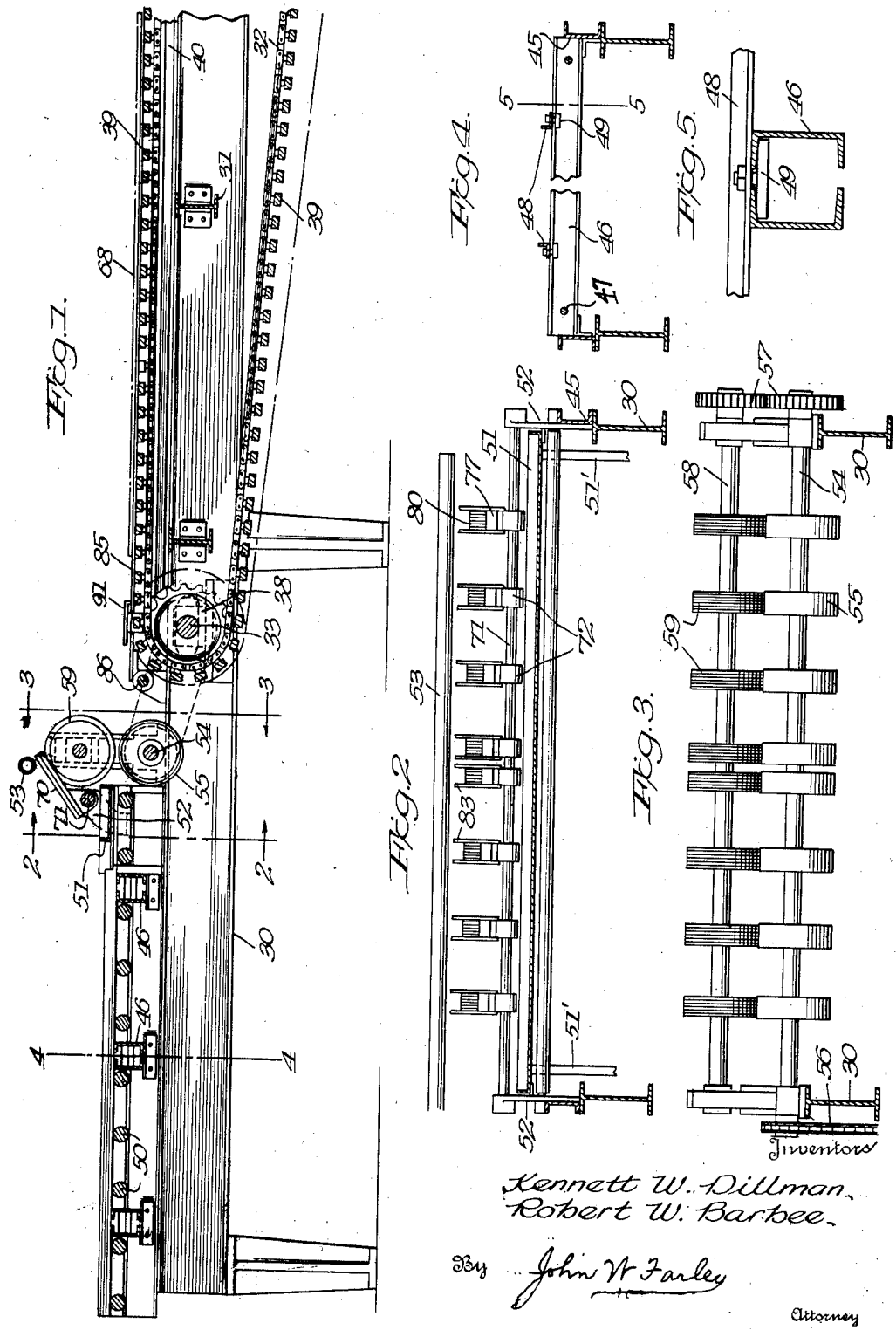

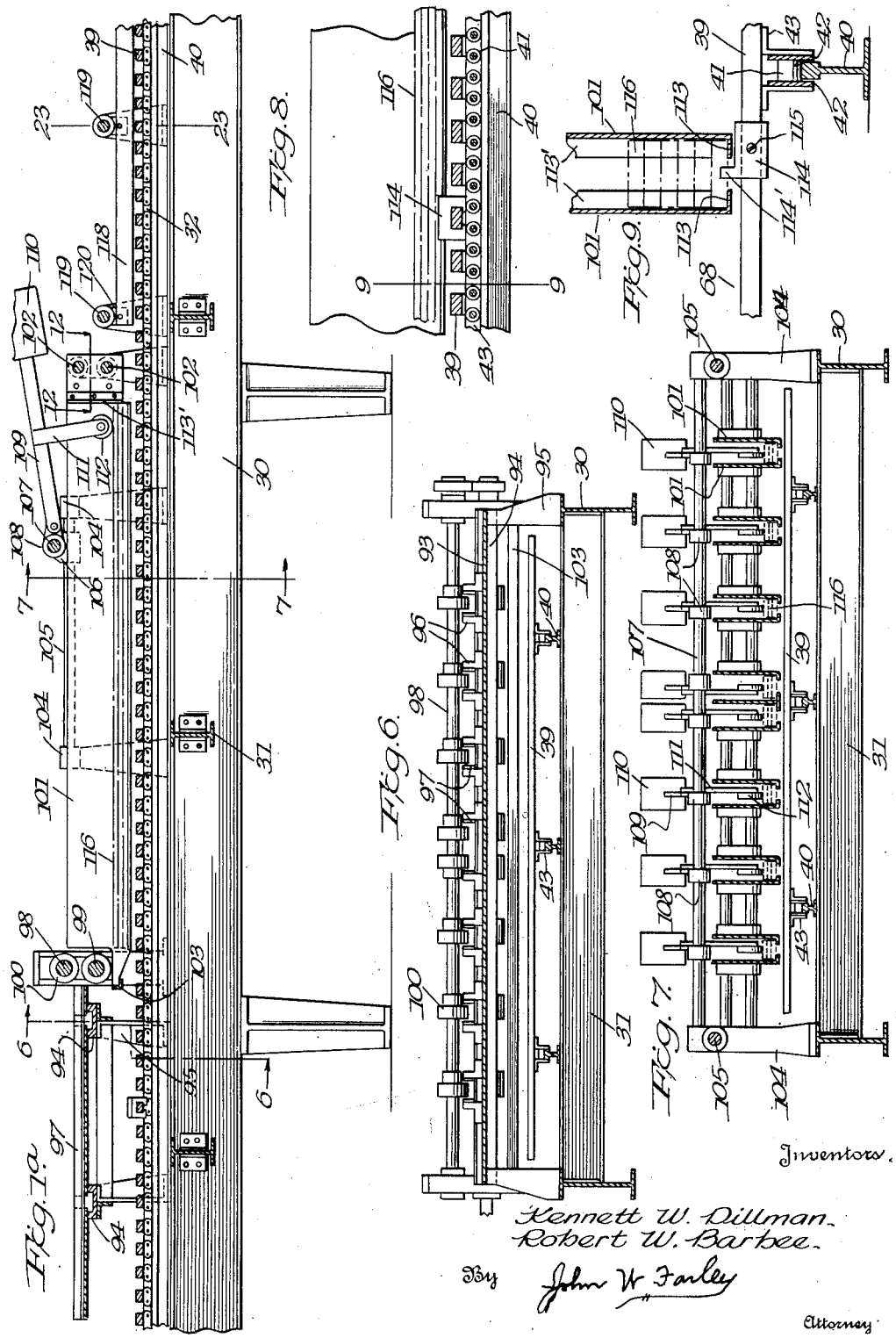

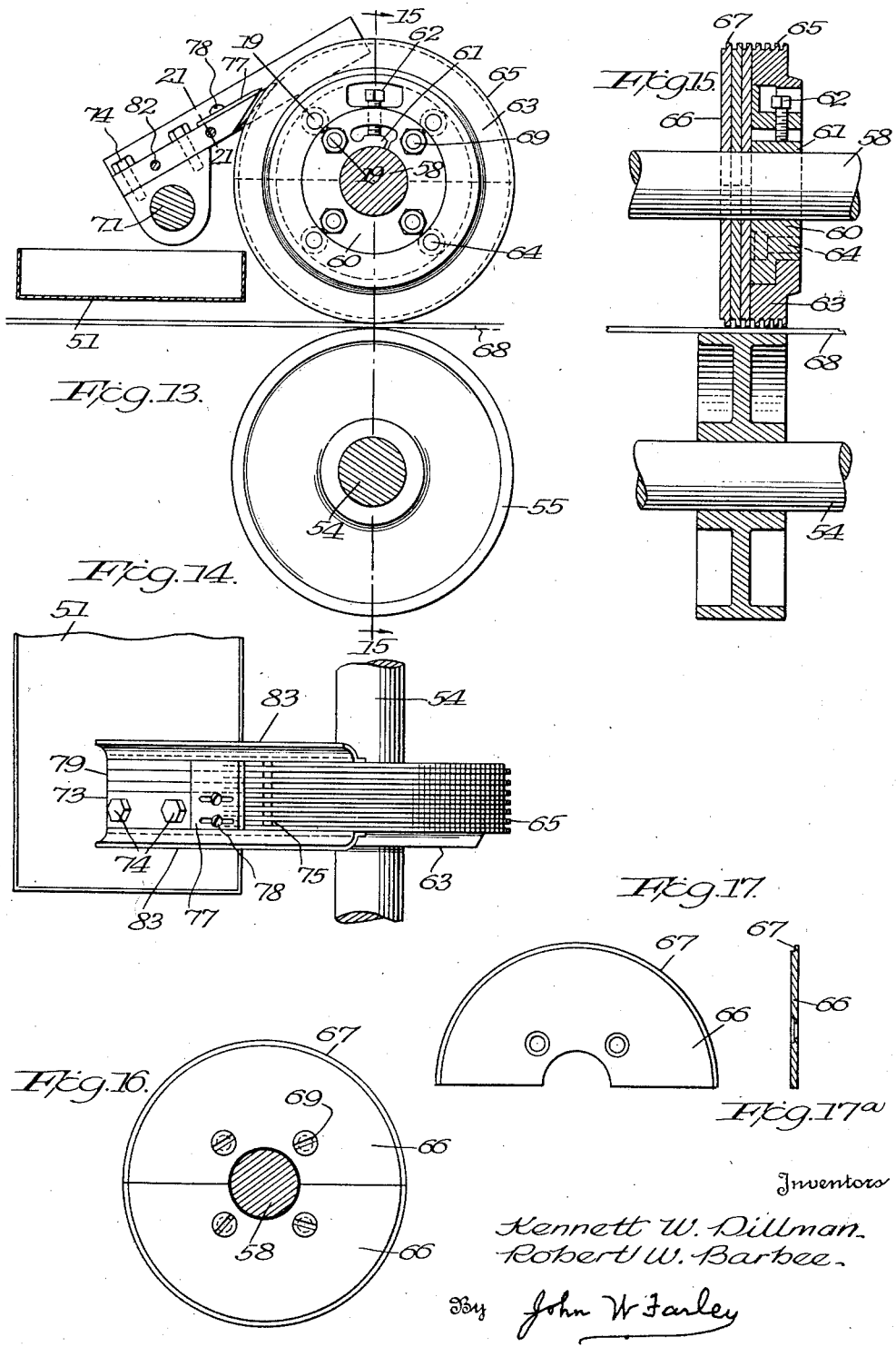

May 26, 1942.  K. W. DILLMAN ET AL  2,284,563
APPARATUS FOR MAKING REINFORCED SHEETS
Filed Dec. 16, 1938  6 Sheets-Sheet 5
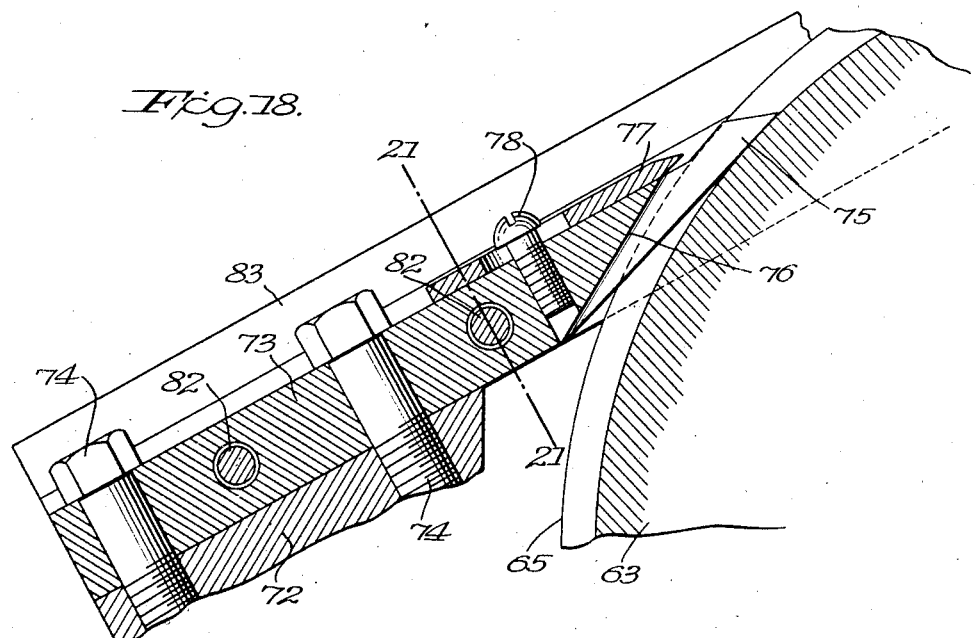
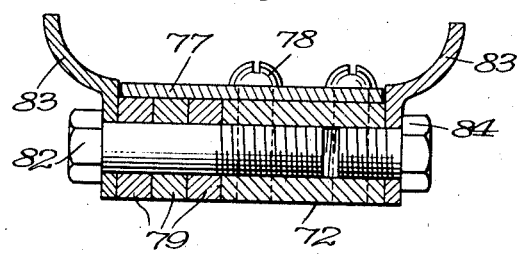
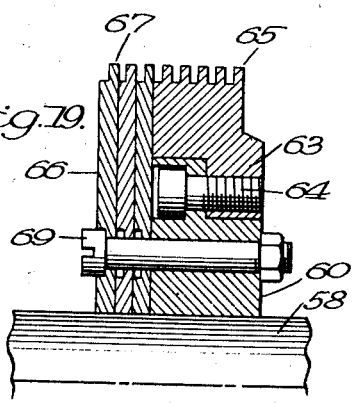
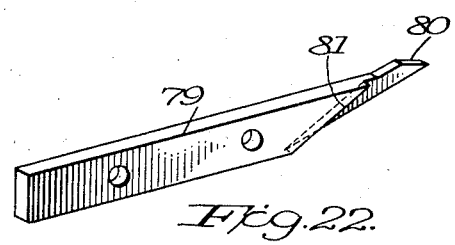
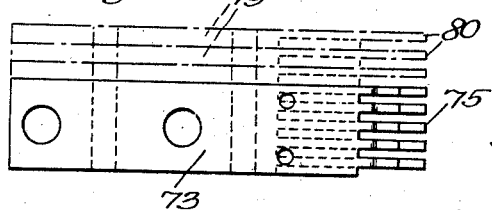
Inventors
Kennett W. Dillman
Robert W. Barbee
By John W. Farley
Attorney

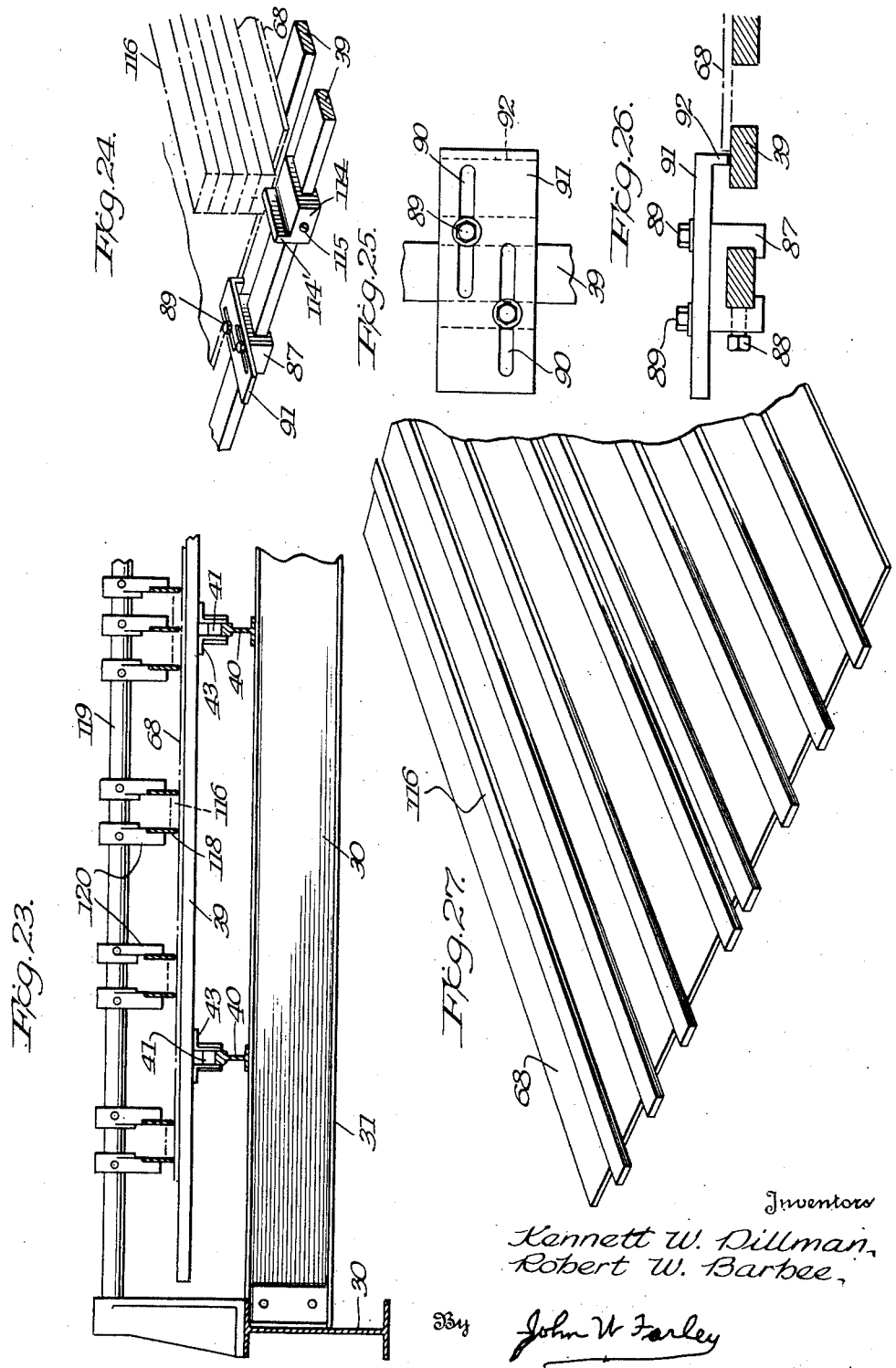

Patented May 26, 1942

2,284,563

UNITED STATES PATENT OFFICE 2,284,563

APPARATUS FOR MAKING REINFORCED SHEETS

Kennett W. Dillman, Caruthersville, Mo., and Robert W. Barbee, Memphis, Tenn.; said Barbee assignor to said Dillman Application December 16, 1938, Serial No. 246,242

22 Claims. (Cl. 154—1)

Our invention relates to a method and apparatus for making reinforced sheets of material, such as may be used in the manufacture of shipping containers, and it is an object of the same to provide a simple, economical and efficient mechanism for making up stock of this kind.

Another object of the invention is to provide maens for applying adhesive material, such as glue, in spaced streaks to sheets of material.

Another object of the invention is to provide means for affixing cleats or analogous strip-like elements to a sheet of paper by means of such streaks of glue, the cleats being applied each to an individual streak of glue and being forced against the paper and held in intimate relation therewith so as to insure permanent adhesion.

Another object of the invention is to provide means whereby cleats of different widths may be applied to sheet material, such as strips of paper.

Another object of the invention is to provide means whereby streaks of adhesive of variable width may be applied to a sheet of paper or the like.

Another object of the invention is to provide automatic feeding means for applying cleats to a sheet of paper.

Another object of the invention is to provide adjustable means whereby the relation of the ends of the cleats to the end of the sheet to which they are to be secured may be adjustably predetermined.

The machine of our invention is intended primarily for making frame members for containers, of the character shown in the patent to Watkins No. 1,955,107, dated April 17, 1934, but we do not limit ourselves to its use for that purpose.

Referring to the drawings, which are made a part of this application, and in which similar reference characters indicate similar parts:

Figs. 1, 1a and 1b in combination show a longitudinal section of the machine of our invention, it being understood that the machine is or may be of greater length than indicated in the drawings, the omitted portions intermediate said figures forming merely continuations of the structures illustrated in these figures, Fig. 2 is a vertical section on line 2—2 of Fig. 1,
Fig. 3, a vertical section on line 3—3 of Fig. 1,
Fig. 4, a vertical section on line 4—4 of Fig. 1,
Fig. 5, a vertical section on line 5—5 of Fig. 4,
Figs. 6 and 7, vertical sections on lines 6—6 and 7—7 respectively of Fig. 1a,
Fig. 8, an enlarged detail of parts shown in Fig. 1a, Fig. 8 showing a different position of certain of said parts,
Fig. 9, a vertical section on line 9—9 of Fig. 8,
Figs. 10 and 11, vertical sections on lines 10—10 and 11—11 respectively of Fig. 1b,
Fig. 12, a horizontal section on line 12—12 of Fig. 1a,
Fig. 13, an enlarged view of a portion of Fig. 1,
Fig. 14, a plan of the such portion,
Fig. 15, a vertical section on line 15—15 of Fig. 13,
Fig. 16, an elevation of parts shown in Fig. 15, viewed from the left of said figure,
Fig. 17, an elevation of a member shown in Fig. 16,
Fig. 17a, a vertical section of the same member,
Fig. 18, a vertical section through parts shown in Fig. 13,
Fig. 19, a section on line 19—19 of Fig. 13,
Fig. 20, a plan of parts shown in Figs. 14 and 18,
Fig. 21, a section on line 21—21 on Fig. 18,
Fig. 22, a perspective of a scraper shown in Figs. 13 and 18,
Fig. 23, a section on line 23—23 of Fig. 1a,
Fig. 24, a perspective of portions of a conveyor,
Fig. 25, a plan of an adjustable abutment shown in Fig. 24,
Fig. 26, a vertical section of portions of the conveyor, showing in elevation the abutment illustrated in Fig. 25 and,
Fig. 27, a perspective of the product of our machine.

The machine consists broadly of an endless conveyor, a roller table or magazine for supporting a plurality of sheets of material such as fiber board, means for feeding such sheets to the conveyor, means for applying spaced streaks of adhesive to the sheets as they pass to the conveyor, means on the conveyor for advancing the sheeets positively, means for positioning cleats on the respective streaks of adhesive, means for holding such cleats in position and forcing them down against the sheet to insure adhesion thereto and means for supporting the finished pieces of stock in such a way that they can readily be removed from the machine. Important features of the machine are the various adjustments whereby sheets of different length and width can be supplied with cleats of appropriate length, suitably spaced on such sheets according to the desire of the operator and the nature of the work called for.

In the drawings reference character 30 indicates generally longitudinal frame members forming parts of the supporting mechanism of our machine said members being connected by transverse beams 31. An endless conveyor is trained about shafts 33 and 34 and mounted in the machine frame, shaft 34 being indicated as being driven by a motor 35 connected to shaft 34 by sprocket gearing 36 or in any other suitable manner. As here shown the conveyor comprises a pair of sprocket chains 32 mounted on sprocket gears 37, 38 and provided with cross bars 39, the upper run of the conveyor being supported by means of beams 40 mounted on cross beams 31 and rollers 41 on cross bars connecting side members 42 of the links of the chain, said side pieces having the cross bars 39 secured thereto by means of brackets 43. The shaft 33 may be driven from shaft 34 by means of the sprocket chains 32, but preferably is driven by an independent sprocket chain 44 trained about suitable sprockets on the respective shafts 33 and 34.

At one end of the machine there is located on the frame 30 a roller table or magazine providing a support for sheets of material. This support comprises side rails 45 mounted on the frame members 30 and having mounted thereon cross rails 46, here shown as mounted in pairs with flanges facing toward each other, the pair of rails being connected by bolts 47 (Fig. 4). Guide rails 48 for the sheets are mounted on the cross rails 46 and secured thereto by bolts having enlarged heads 49 (Fig. 5), whereby each guide rail is clamped to each of a pair of cross rails. The flanges of cross rail 46 being spaced apart it will be seen that provision is thus made for adjustment of the guide rails 48 crosswise of the machine according to the width of the sheets on the table. Between the cross rails 46 rollers 50 are provided, these rollers being journaled in suitable brackets on longitudinal rails 45, or in other suitable manner.

At the forward end of the sheet supporting means a glue pan 51 is mounted on brackets 52 (Figs. 1 and 2). This pan may be connected at its ends by pipes 51′, 51′ to a glue mixer (not shown) whereby the glue is mixed and pumped to a pipe 53 (Fig. 1) from which it is discharged on glue applying rolls on a shaft forming part of a glue applying apparatus.

The glue applying apparatus is shown in Figs. 1 to 3 and 13 to 22 and comprises a lower shaft 54 with enlarged roller feed portions 55 adjustably secured to the shaft, this shaft being driven by means of a sprocket chain 56 passing over suitable sprockets on shafts 33 and 54. The shaft 54 is connected by gears 57 to shaft 58 of the upper roller, which has enlarged roller feed portions 59 to which glue is supplied by the pipe 53. The glue applying rollers indicated generally at 59 in Figs. 1 and 3 are shown in detail in Figs. 13 to 19. In the form at present preferred each of these portions comprises a hub 60 having a resilient tongue 61 (Figs. 13 and 15) which may be clamped to the shaft 58 by a set screw 62. A detachable rim 63 is secured to the hub, as by screws 64, and this hub is shown as supplied with circumferentially extending ridges 65 by means of which glue or other suitable adhesive is applied to the sheets of material in narrow stripes, providing what we call a streak of glue, preferably consisting of continuous narrow stripes which may merge into one another by the lateral flowing of the glue if sufficient glue is supplied thereto. It will be understood that these ridges can be arranged and spaced as desired and may also consist of discontinuous portions so as to form dots of glue on the sheet instead of continuous stripes or may otherwise be varied in detail. The upper and lower rolls may be adjusted lengthwise of their shafts, according to the desired position of the streaks of adhesive on the sheets used.

It will be obvious that the rims 63 may be exchanged for others having a larger or smaller number of circumferential ridges, as may appear desirable. For further varying the width of the streak of adhesive we provide semi-circular detachable segments 66 (Figs. 16, 17 and 17a) which are also shown as having each a peripheral ridge 67 for the application of an adhesive to a sheet of material such as shown at 68 in Figs. 13 and 15 and elsewhere. The segments are applied in pairs as will be obvious, and any desired number may be so applied and secured to the hub 60 by means of bolts 69.

The excess of adhesive material which is applied to the upper glue roller is scraped off and returned to pan 51 as waste, or for further circulation as above stated. Details of the scraping means are shown in Figs. 14, 18, 20, 21 and 22, the scraper being indicated generally in Fig. 1 at 70 and being pivotally mounted at 71 on brackets 52.

The base 72 of the scraper is mounted on pivot 71 and a body member 73 is secured to the base by bolts 74 extending through holes in said body. At its forward end the body 73 is provided with a plurality of fingers 75 each shaped to fit between a pair of ridges 65 so as to remove adhesive material from between said ridges. Each finger has a shoulder portion at 76 which may serve to remove excess material from the top of the adjacent ridge, but for this purpose we prefer to rely on a blade 77 extending across the entire width of the adjacent glue roller, said blade being adjustable along the scraper to vary the permissible thickness of the glue on the ridges, by means comprising screws 78 passing through elongated slots in the blade and into the body 73.

It will be evident that the detachable body 73 can be exchanged for other bodies with fingers corresponding to the grooves in other rim members, such as may be substituted for rim 63 herein illustrated. In case a glue roller is widened by the use of segments 66, the scraper may also be widened by attaching thereto separate blades 79 such as shown in Fig. 22, the blades having individual scraping fingers 80 and overhanging shoulders 81 such as above described. The additional blades are secured to the body 72 by screws 82. Since the fingers 75 and 80 and the blade 77 coact to remove the excess glue from the glue roller, which glue thereafter flows over the top of the scraper and so to the pan 51, it is desirable to prevent the glue from running over the sides of the scraper and for this reason we provide side pieces 83 which are secured to the sides of the scraper by screws 82 and 84 respectively, so as to form a trough-like construction for conveying the excess glue back to the pan 51. It will be evident that the width of the scraper may be changed to correspond to a change in the width of the glue roller by adding or removing blades 79, whose fingers 80 must of course correspond to the width of the grooves between ridges 67, and by replacing blade 77 by one of appropriate width. The left hand trough member 83 is removed, together with its screws 82, to permit changes in blades 79.

The sheets 68 may be placed one by one on the roller support or a stack of sheets may be placed thereon and fed off one by one. In either event the sheet to be treated passes underneath the pan 51 and between it and the adjacent rollers 50, then between the upper and lower glue rollers which feed the sheet forward. After this it is supported by pivoted members 85 extending for a substantial distance at each side of the upper run of the conveyor, these guides 85 being arranged at a level where they maintain the sheet out of contact with the slats 39, and being pivoted at 86 on the machine frame.

The sheet is supported in such position temporarily, until it is engaged by driving lugs on the conveyor, here shown as mounted on a slat of the conveyor. The lugs such as at present preferred by us are shown in detail in Figs. 8, 9, 24, 25 and 26 and they comprise brackets 87 embracing a slat 39 and fixed thereto by screws 88. Each bracket is provided with screws 89 adapted to extend through elongated slots 90 of a lug 91 having a downwardly extending flange 92 at its forward end constructed to extend between a pair of slats or to approach closely to the top of the slat next ahead of its supporting slat, and thus to engage the rear end of the sheet 68 and carry the same positively forward.

After a sheet has been engaged by lugs 91 of the conveyor and has been moved beyond the pivoted supporting members 85 it will rest on the slats 39 of the conveyor and it is thereafter supplied with a suitable number of cleats, each individual cleat being positioned on a streak of adhesive, as above defined. In the preferred form of the invention herein illustrated the cleats are fed parallel to the movement of the conveyor and to each other and it will be seen that they may be spaced apart as desired or the number may be varied by leaving empty certain compartments of the magazine now to be described. The means for furnishing these cleats comprises a feed table 93 supported by cross bars 94 on brackets 95 carried by the machine frame, the cross bars 94 having slots at the top in which are located downward projections on slidably mounted dogs 96 arranged in pairs on each of the cross bars and said pairs of dogs supporting pairs of longitudinally-extending guide rails 97 appropriately spaced for receiving a cleat of desired width.

In front of the table two shafts 98 and 99 are supported in suitable brackets on the machine frame, these shafts being geared together and being driven by a separate motor (not shown). These shafts are provided with enlargements 100 for gripping a cleat and feeding it forward into a magazine which comprises series of pairs of side pieces 101 for holding a stack of cleats, these side pieces 101 being supported at their forward ends by means of a pair of bars 102 (Fig. 12) and at their rear ends having extensions resting on the lower flange of an angle iron 103 fixed to the roller supporting brackets. Brackets 104 (Figs. 1a and 7) at the sides of the machine support longitudinal bars 105 carrying slidable supports 106 for a cross bar 107 on which are mounted collars 108 adjustable transversely of the machine, these and other similarly adjustable parts being preferably held by set screws or other suitable means. Trampers are mounted on said collars, there being one tramper for each magazine compartment for holding down the cleats in said compartments at their forward end, and said trampers comprise levers 109 having weights 110 at their free ends and provided with downwardly extending arms 111 each having a roller 112 at its lower end to bear on the cleats, said roller being readily lifted by a cleat which is being fed into the magazine by the rotation of shafts 98, 99.

It will be seen that the width of the magazines can be altered by sliding the guide members 101, forming the walls of a compartment of a magazine, toward or from each other on bars 102 and angle iron 103, the table guides 97, the enlargements 100 on shafts 98 and 99 and the trampers being all laterally adjustable as well, to suit the desired conditions with reference to the width and number of magazines and of cleats to be applied to the sheets 68. A compartment formed by two side walls 101 is open at its bottom as shown in Figs. 7 and 9, the side walls 101 having inwardly extending flanges 113 for supporting the cleats, and the compartment is also open at each end, but has inturned end flanges 113', 113' (Figs. 1a and 12) shaped to prevent forward movement of all but the lowermost of the cleats in the compartment.

For feeding cleats from the desired compartments we provide abutments 114 (Figs. 8, 9, 24, 25 and 26) adjustably secured to slats 39 as by means of set screws 115, the upwardly projecting lug 114' of an abutment being positioned to engage the rear end of the lowermost cleat in a compartment and to push it out from underneath the stack in the manner illustrated in Fig. 8. As best shown in Fig. 24 the lugs 114 for feeding out the cleats for a sheet are preferably mounted on the same slat as the sheet feeding lugs 91 and, due to the fact that the lugs 91 are adjustable, the cleats may be permitted to extend beyond the end of the sheet, as shown in Figs. 24 and 27, the extent of such projection being varied by adjustment of lugs 91. Their projection beyond the other end of the sheet is determined by the relative lengths of the sheet and the cleats. A stack of suitable cleats 116 is indicated in dotted lines in Figs. 1a, 7, 8, 9 and 24 and individual cleats are similarly indicated in Figs. 1b, 10, 11, 23 and 27.

After leaving the magazine the individual cleats 116 are guided in their position on the sheet by means of side rails 118 mounted in pairs to engage opposite sides of the cleat (Figs. 1a and 23). These side rails are suspended from shafts 119 extending crosswise of the machine and supported by suitable brackets, each shaft carrying dependent arms 120 secured to the shaft by set screws or the like, so that the rails can be adjusted transversely of the machine.

Rails 118 guide the cleats until they reach compression means which force the cleats firmly down on the sheet that is supported beneath them by the slats 39. Such compression means comprises sets of rods 121 extending lengthwise of the machine, the rods of each set being equal in number to the compartments in the magazine and there being as many successive sets as are necessary for causing the cleats to adhere properly to their sheets. The rods 121 are provided with rollers 122 which bear on the cleats and the rods are floatingly supported. For this purpose brackets at the sides of the machine support rods 123, 124 and 124'. The rods 123 are mounted on arms 123' secured to rod 124' and provided with collars 125 fixed to rod 123. A pair of levers 126 are pivotally connected to each collar 125 and each pair of levers 126 has fixed thereto at the free end a weight 127. Adjacent the weight 127 each pair of levers is connected by a depending link 128 to a rod 121 and the downward movement of the said levers is limited by means of a pin 129 carried by guide arms 129' that are fixed to rod 124, the pins 129 serving to prevent the rollers 122 from descending far enough to ride on the slats 39 on the conveyor. Adjacent its rear end the rod 121 has pivotally connected thereto a plunger 130 guided for up and down movement by pins 131 on the lever 126 and having at its upper end a weight 132. Downward movement of the plunger is limited by a pin 133 on the plunger adapted to rest on the levers 126 so as to prevent contact of the rollers at the rear end of the rod 121 with the moving bed provided by the upper run of the conveyor.

Upon passing beyond the compression means the completed reinforced sets pass to an out feed mechanism comprising a series of rollers 134 which are formed as adjustable collars on a shaft 135, the collars being adjustably mounted on the shaft so that they can be moved into position to underlie those portions of the sheet 68 carrying the cleats 116. Shelves 136 are positioned between each pair of rollers as additional guiding and supporting means for the sheet. The shafts are each driven by means of a sprocket 137 at one end thereof. Idler sprockets 138 are mounted on intermediate rollers to insure proper driving engagement between sprockets 137 and a sprocket chain 139 trained about all of said sprockets. A lever 140, pivoted at 141, carries a weight 142 on its free end and is provided at an intermediate point with a roller 143 bearing on the endless sprocket chain 139 to keep the same taut.

The sprocket chain 139 is driven by means of sprocket gearing comprising a sprocket chain 144 trained about a sprocket 145 on shaft 34 and about a sprocket at 146 on the outermost shaft 135. The completed reinforced sheets of stock may be removed from this roller table by hand or in any other suitable manner.

It is thought that the operation of the machine will be clear from the foregoing description. It should be noted, as an important feature of our invention, that all the guiding means for the sheets and the cleats, as well as other parts acting to apply glue to force the sheets and cleats together and to support them, etc., are adjustable so as to provide for the use of sheets and cleats of different widths and lengths, and to permit variable positioning of cleats on the sheets, varying numbers of cleats on a sheet, etc., while yet affixing the cleats to the sheets with equal security under all conditions.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

Having thus fully described our invention, what we claim is:

1. In a device of the character described, the combination of means for supporting sheets of material, means for applying adhesive thereto in spaced streaks, means for positioning relatively rigid strips on the streaks of adhesive, floating means for applying pressure to the strips so positioned, and means for limiting the movement of said pressure-applying means to prevent contact thereof with said sheet-supporting means.

2. In a device of the character described, a conveyor for supporting a sheet of material, means for applying adhesive to said sheet in streaks extending in the direction of the movement of the sheet, means for applying cleats to the individual streaks of adhesive, abutments on the conveyor for engagement with the rear ends of individual cleats, said last-named abutments and said adhesive applying means being each mounted for individual adjustment transversely with reference to the conveyor.

3. A device as in claim 2, including means individual to a cleat for pressing the cleats against the corresponding sheet, said pressing means being adjustable transversely of the conveyor.

4. In a machine of the character described, the combination of an endless conveyor for supporting a sheet of material and moving the same endwise in a substantially horizontal plane, a cleat magazine above said conveyor, said magazine having a plurality of compartments extending lengthwise of said conveyor, means at the forward end of the magazine for exerting pressure on the cleats in said compartments, and means on the conveyor for engaging a cleat at the bottom of each cleat-containing compartment to move the cleat endwise into position to rest on said sheet.

5. A device as in claim 4, the side walls of said compartments being adjustable for accommodating cleats of different widths.

6. A device as in claim 4, including a table at the rear end of said magazine, means on said table for supporting cleats in line with said compartments, and means adjacent said table for engaging a cleat and feeding it into a compartment in said magazine.

7. In a device of the character described, a traveling bed, means for assembling thereon sheets and cleats superposed on said sheets, said cleats extending in the direction of the travel of said bed, means for pressing on each cleat in its movement with the bed, and means for preventing engagement of said pressing means with said bed.

8. In a device of the character described, a traveling bed, means for applying cleats to an adhesive sheet on said bed comprising a magazine, said magazine being constructed to permit egress of the lowermost of a group of cleats therein and means for moving such lowermost cleats in timed relation with a sheet carried by said traveling bed.

9. A device as in claim 8, with a tramper for each group of cleats.

10. A device as in claim 8, with a tramper for each group of cleats, rollers on the tramper adapted to rest on such a group adjacent one end of the group, whereby a cleat inserted endwise into the magazine on top of the group may lift the tramper.

11. A device as in claim 8, with a tramper for each group of cleats, rollers on said trampers adapted to rest on such a group adjacent one end of the stack, whereby a cleat inserted endwise into the magazine may raise the tramper, and supporting means for said trampers adjustable lengthwise of said magazine.

12. A device as in claim 8, including means acting on said cleats after their application to said sheet for pressing them firmly into contact therewith, and guides located between said magazine and said pressing means for holding said cleats in position on a sheet.

13. A device as in claim 8, including trampers in the magazines, means acting on said cleats after their application to said sheet for pressing them firmly into contact therewith, guides located between said magazine and said pressing means for holding said cleats in position, the walls of said magazines, said trampers, said pressing means, and said guides being all adjustable laterally with reference to said bed.

14. In a device of the character described, an endless conveyor for holding sheets of fiberboard or the like in predetermined position, a magazine having compartments extending lengthwise of said conveyor, separate side wall members for each compartment with a space between them at the bottom of the compartment, and means on said conveyor adapted to enter said space and force a cleat endwise out of the magazine into a predetermined position on said sheet.

15. In a device of the character described, the combination of means for supporting sheets of material, means for applying adhesive thereto in spaced streaks, means for positioning relatively rigid strips on the streaks of adhesive, means for applying pressure to the strips so positioned, and means for limiting the movement of said pressure-applying means to prevent contact thereof with said conveyor.

16. In a device of the character described, a conveyor for advancing a sheet of material, means for applying adhesive to said sheet in streaks extending in the direction of sheet movement including magazines, abutments on the conveyor for engaging individual cleats in the magazines and moving them with the sheet while spaced therefrom, and means associated with each cleat for pressing the cleats against a respective adhesive streak on a sheet as the cleats and sheet move.

17. In a device of the character described, a conveyor for movably supporting sheets of material, means for positioning a series of cleats at a point adjacent to the path of said sheets, means for applying adhesive to said sheets only at the parts to be contacted by the cleats, means on the conveyor for moving the sheets and cleats at the same longitudinal speed while separated, and means for relatively laterally moving the cleats and sheets into contact while moving with said conveyor.

18. In a device of the character described, a conveyor for advancing a sheet of material, means for applying adhesive to said sheet, a magazine, an abutment on the conveyor for engaging an individual cleat in the magazine and moving it from the magazine and with the sheet, and means associated with each cleat for pressing the cleat against the adhesive on the sheet after the cleat and sheet have moved a distance adapted substantially to remove the cleat from its magazine.

19. In apparatus of the class described, means for applying crosswise spaced areas of adhesive to a sheet, a conveyor for moving the sheet longitudinally, driving means movable with the conveyor and engageable respectively with cleats, supply compartments laterally spaced according to the lateral spacing of said adhesive areas and carrying said cleats, said supply compartments normally holding the cleats therein separated from the sheet, said driving means moving individual cleats along with the sheet, and means for subsequently forcing the cleats laterally against said spaced areas of adhesive as the sheet and cleats move longitudinally.

20. In apparatus of the class described, means for applying spaced areas of adhesive to a sheet, a conveyor for moving the sheet, driving means movable with the conveyor and engageable respectively with cleats, supply compartments laterally spaced according to the lateral spacing of said adhesive areas and carrying cleats, said supply compartments normally holding the cleats therein separated from the sheet, said driving means moving separated cleats along with the sheet, and means for subsequently forcing the cleats against said spaced areas of adhesive as the sheet and cleats move with the same velocity, and subsequently pressing together the sheets and cleats.

21. In a device of the character described, a conveyor for supporting sheets of material, means for positioning a series of cleats on each of said sheets, means for applying adhesive to said sheets at the parts to be contacted by the cleats, and means for applying pressure to the cleats to force them into intimate contact with said sheets while they are moving with said conveyor, said strip positioning means comprising a strip magazine above said conveyor with spaced compartments for receiving cleats in each compartment, means on the conveyor for holding a sheet in predetermined position thereon, and correlated means on the conveyor for engaging cleats in said compartments so as to cause such cleats to pass from said magazine to a sheet passing thereunder and to be properly positioned on such a sheet.

22. In a device of the character described, a conveyor for supporting sheets of material, means for positioning a series of cleats on each of said sheets, means for applying adhesive to said sheets at the parts to be contacted by the cleats, and means for applying pressure to the cleats to force them into intimate contact with said sheets while they are moving with said conveyor, including independent abutments on said conveyor for engagement with the rear ends of said sheets and said cleats respectively, said abutments being relatively adjustable lengthwise of the conveyor so that the ends of the cleats may be located out of registration with the corresponding end of the sheet to which they are to be affixed.

KENNETT W. DILLMAN.
ROBERT W. BARBEE.